(12) United States Patent
Saito et al.

(10) Patent No.: US 7,564,578 B2
(45) Date of Patent: Jul. 21, 2009

(54) IMAGE COMMUNICATION APPARATUS, METHOD AND STORAGE MEDIUM FOR TRANSMITTING OR RECEIVING A COLOR IMAGE

(75) Inventors: Toshiaki Saito, Kitasoma-gun (JP); Takehiro Yoshida, Shibuya-ku (JP); Yuji Kurosawa, Kashiwa (JP); Shoichi Yamaguchi, Yokohama (JP); Daisuke Suga, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 659 days.

(21) Appl. No.: 11/202,105

(22) Filed: Aug. 12, 2005

(65) Prior Publication Data

US 2005/0270574 A1    Dec. 8, 2005

Related U.S. Application Data

(62) Division of application No. 09/605,372, filed on Jun. 29, 2000, now Pat. No. 7,092,113.

(30) Foreign Application Priority Data

Jun. 30, 1999    (JP)    ................................ 11-186727

(51) Int. Cl.
    *G06F 15/00*    (2006.01)
    *G06F 3/00*    (2006.01)
(52) U.S. Cl. ....................... 358/1.15; 358/500; 358/400
(58) Field of Classification Search ......... 358/434–450, 358/1.15, 500, 400, 426.13, 426.14, 426.15, 358/426.16
    See application file for complete search history.

(56) References Cited

U.S. PATENT DOCUMENTS

| 5,485,282 | A | * | 1/1996 | Takeda | ........................ 358/435 |
| 5,537,231 | A | * | 7/1996 | Hisada et al. | ................ 358/530 |
| 5,719,686 | A | | 2/1998 | Sakamoto et al. | ............ 358/444 |
| 5,757,965 | A | | 5/1998 | Ohki | ........................... 358/449 |
| 5,835,923 | A | | 11/1998 | Shibata et al. | ............... 358/453 |
| 5,937,106 | A | | 8/1999 | Murayama | ................... 382/296 |
| 6,005,673 | A | | 12/1999 | Murai et al. | ................. 358/434 |
| 6,775,035 | B1 | | 8/2004 | Yoshida | ...................... 358/539 |

* cited by examiner

*Primary Examiner*—Thomas D Lee
(74) *Attorney, Agent, or Firm*—Fitzpatrick, Cella, Harper & Scinto

(57) ABSTRACT

In an image communication apparatus for communicating a color image with a distant apparatus according to the ITU-T recommendations upon line connection, an original image is read by a scanner unit, and the size of the read original image is identified. If the identified size of the original image is smaller than the page size defined by the ITU-U recommendation, image data is generated by reading the original image upon adding invalid data to the original image to make it have a main scanning length equal to the main scanning length of the minimum page size defined by the ITU-T recommendation in reading the original image through the scanner unit, and the image data is compressed by a JPEG compressing unit and transmitted. In this case, the valid image area of the compressed data is set in accordance with the size of the original image. This allows the receiving side to read only the valid image area, decode the valid image area, and reproduce the image.

6 Claims, 15 Drawing Sheets

FIG. 15

| PAGE MANAGEMENT INFORMATION TABLE | |
|---|---|
| NEXT_TABLE | NEXT PAGE MANAGEMENT INFORMATION TABLE POINTER |
| DATA_TYPE | PAGE DATA TYPE ( JPEG/MH/MR/MMR ) |
| RESOLUTION | RESOLUTION ( 200/300/400dpi ) |
| PAGE_H_SIZE | PAGE DATA MAIN SCANNING PIXEL COUNT |
| PAGE_V_SIZE | PAGE DATA SUB-SCANNING PIXEL COUNT |
| LEFT | VALID DATA START POSITION : LEFT END |
| TOP | VALID DATA START POSITION : UPPER END |
| VALID_H_SIZE | VALID DATA MAIN SCANNING PIXEL COUNT |
| VALID_V_SIZE | VALID DATA SUB-SCANNING PIXEL COUNT |
| MEMORY_BLOCK | IMAGE MEMORY BLOCK POINTER |
| DATA_SIZE | IMAGE DATA SIZE ( BYTE COUNT ) |

IMAGE COMMUNICATION APPARATUS, METHOD AND STORAGE MEDIUM FOR TRANSMITTING OR RECEIVING A COLOR IMAGE

CROSS-REFERENCE TO RELATED APPLICATION

This application is a divisional of U.S. patent application Ser. No. 09/605,372, filed Jun. 29, 2000, the entire disclosure of which is incorporated herein by reference.

FIELD OF THE INVENTION

The present invention relates to an image communication method and apparatus for transmitting/receiving image signals.

BACKGROUND OF THE INVENTION

With the recent progress in the functions of image recording means and image display means, high-quality color copying machines, color printers, and the like have become rapidly popular. In the field of image communication apparatuses, color facsimile apparatuses and the like have been developed. Communication schemes for such color facsimile apparatuses are being standardized as ITU-T recommendations such as T30, T40, T42, and T81. In addition, as an encoding scheme for such color images, T81 of JPEG (Joint Photographic Expert Group) is used.

In a color facsimile apparatus standardized as the ITU-T recommendation T30, as minimum requirements for color image data, a width in the main scanning direction: A4 and a resolution: 200 dpi are defined. As options, a width in the main scanning direction: B4/A3 and a resolution: 100/300/400 dpi can be selected.

As color printing schemes, a thermal sublimation transfer scheme, thermal fusion transfer scheme, electrophotographic scheme, ink-jet scheme, and the like are known. The respective schemes have merits and demerits in terms of color image reproducing capability. In addition, the color reproducing capability varies depending on the type of printing paper to be used, the type of ink, and the arrangement of an apparatus.

There are growing user needs for transmission of an image having a size equivalent to, for example, a snapshot by using such a color facsimile apparatus. With a conventional facsimile apparatus, however, even when an image of such a size is transmitted, since the minimum size of an image that can be transmitted/received is A4, the image is transmitted as an A4-size document. For this reason, the receiving apparatus prints even the image of the snapshot size on an A4-size printing sheet, resulting in a waste of the printing sheet. In addition, an expensive, special printing sheet is used to print a sharp color image. In this case, an expensive printing sheet is wasted.

Furthermore, when a small-size image like the one described above is transmitted in A4 size, even a meaningless data portion is produced as image data. As a consequence, useless transmission data increases in amount, and the communication time is prolonged accordingly, resulting in an extra communication cost.

In the color facsimile procedure according to the T30 recommendation, a quantization table that determines image quality in compressing (JPEG-compressing) a color image is also sent to the receiving apparatus. This means that the reproduction quality of image data to be transmitted can be arbitrarily determined on the transmitting side. For this reason, for example, even if the color reproducing capability of the apparatus on the receiving side is low, the quality of an image generated on the transmitting side may become excessively high. In such a case, the amount of unnecessary transmission data increases, and hence the corresponding communication time and cost are wasted.

SUMMARY OF THE INVENTION

The present invention has been made in consideration of the prior art described above, and has as its object to provide an image communication method and apparatus in which when image data is compressed on the transmitting side, the valid image area of the compressed data is set and the receiving side is notified of it, thereby allowing the receiving side to extract only the valid image area and print it on a printing medium of a size suitable for it.

It is another object of the present invention to provide an image communication method and apparatus which can prevent image data, transmitted from the transmitting side from being wasted by transmitting image data to the receiving side in accordance with the printing capability of the receiving side.

It is still another object of the present invention to an image communication method and apparatus which can save communication time by decreasing the amount of transmission data by compressing image data, when the size of an original image to be transmitted is smaller than the size defined in a communication procedure according to the recommendation, after adding invalid data to the image data of the original image to make it have a size equal to the defined size.

It is still another object of the present invention to provide an image communication method and apparatus which can transmit an original image of an arbitrary size, when the size of the original image on the transmitting side is the size defined in the communication procedure according to the recommendation, by declaring that image data of a size smaller than the defined size can be received.

It is still another object of the present invention to provide an image communication method and apparatus for transmitting image data from the transmitting side to the receiving side in accordance with a receiving/printing capability of receiving and printing image data on the receiving side.

In order to achieve the above objects, according to the present invention, there is provided an image communication apparatus for communicating a color image with a distant apparatus according to the ITU-T recommendations upon establishing line connection, comprising original read means for generating image data by reading an original image, identification means for identifying a size of the original image read by the original read means, compression means for compressing the image data, and control means for, when the size of the original image, identified by said identification means, is smaller than a page size defined by the recommendation, causing said original read means to read the original image upon adding invalid data thereto to make the image data have a page size equal to the page size defined by the recommendation, and performing control to set a valid image area of the image data compressed in accordance with the size of the original image in a case where the image data is compressed by the compression means and transmitted.

In addition, according to the present invention, there is provided an image communication apparatus for communicating a color image with a distant apparatus according to the ITU-T recommendations upon establishing line connection, comprising original read means for generating image data by reading an original image, identification means for identifying a size of the original image read by the original read means, compression means for compressing the image data, and control means for, when the size of the original image, identified by the identification means, is smaller than a page size defined by the recommendation, causing the original read means to read the original image in the size of the original image and performing control to designate a size of the original image in a case where the image data is compressed by the compression means and transmitted.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, server to explain the principles of the invention.

FIG. 15 is a view for explaining a received page management information table according to this embodiment.

DETAILED DESCRIPTION OF THE PREFERRED EMBODIMENT

Figure 1:
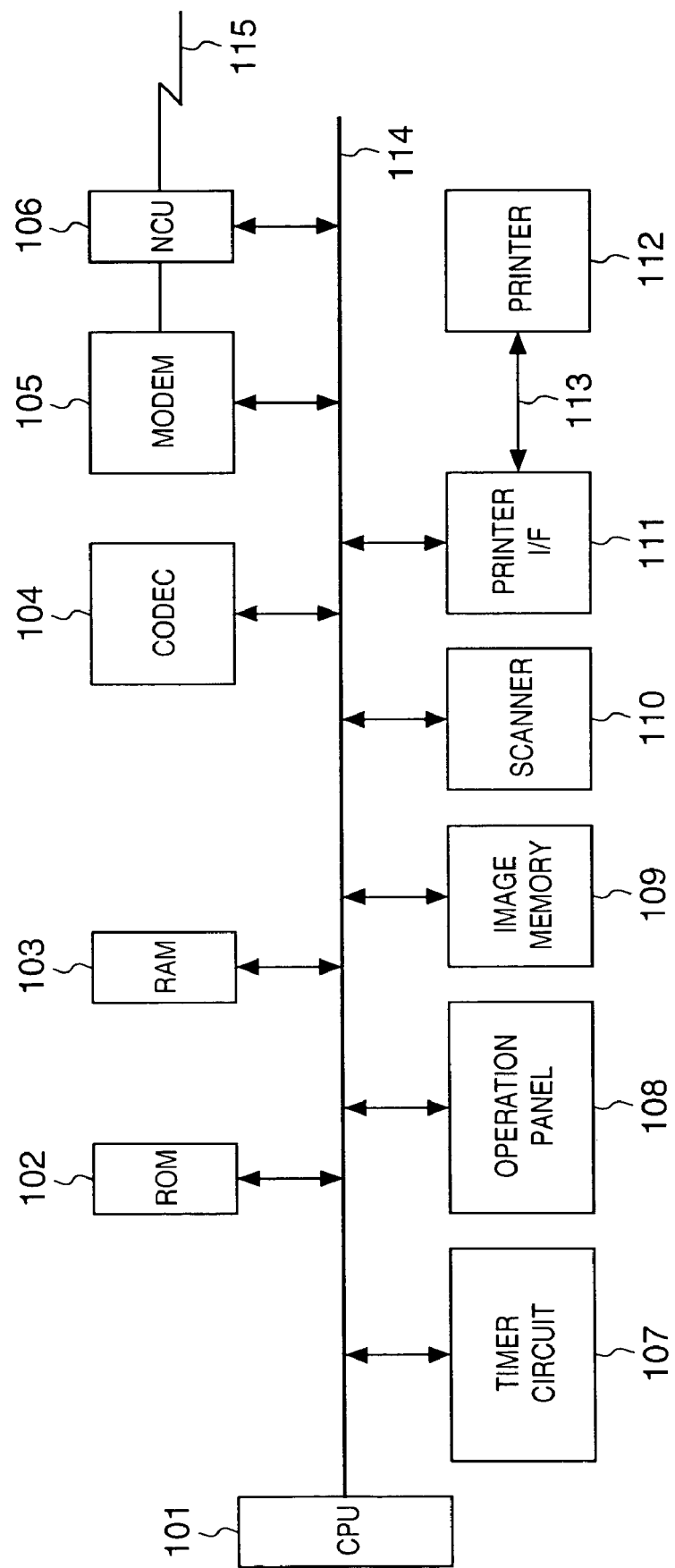
FIG. 1 is a block diagram showing the arrangement of a color facsimile apparatus according to an embodiment of the present invention.

Characteristic features of an embodiment of the present invention will be described below first.

In reading an original image and transmitting the resultant data, an image communication apparatus (e.g., a color facsimile apparatus) according to this embodiment recognizes the size of an original to be read. When the original is transmitted in page size smaller than the page size defined in a communication procedure according to the recommendation T30, the original image is read upon adding invalid data to the image data obtained by reading the original to make the image data have a size equal to the page size defined in the communication procedure according to the recommendation T30. When the read color image data (containing invalid data) is JPEG-compressed, a valid image area in the compressed data is set by using a comment marker or the like in a JPEG header, and the resultant data is transmitted. With this operation, on the receiving side, the valid image area of the received image data can be recognized, and hence a printing medium (printing paper) having a size suitable for printing of the received image can be selected. This makes it possible to prevent an image from being printed on a portion of a large printing sheet, thus preventing the printing sheet from being wasted.

In addition, the data format of this JPEG-compressed image data is equivalent to the communication format defined by the ITU-T recommendation T30 except that a comment marker that can be arbitrarily set is added. This format can therefore be applied to other general color facsimile apparatuses without posing any problem.

If the original size is small in reading an original image, blank data is added as invalid data to the original image to make it have a main scanning length equal to the minimum main scanning length of a page defined by the recommendation T30. With this operation, the image data to be JPEG-compressed is data obtained by adding minimum necessary data to valid image data, and hence an increase in the amount of compressed data can be minimized, thereby saving the communication time.

In addition, when the main scanning size (A4/A4, B4/A4, B4, or A3) defined by the recommendation T30 is declared as the main scanning size of image data that can be received and is declared on the receiving side, information declaring that any image data having a main scanning size equal to or smaller than the declared as a maximum value can be received is defined in a DIS signal according to the ITU-T recommendation T30. With this operation, since image data having an arbitrary size within the maximum original size declared on the receiving side can be transmitted, no invalid image data is transmitted.

Furthermore, color reproducing capability information for notifying the transmitting side of the color image reproducing capability of the receiving apparatus when a color image is output in image printing or display operation on the receiving side is defined in a DIS signal according to the ITU-T recommendation T30. This allow the transmitting side to select an optimal compression parameter for determining the image quality of transmission data in accordance with the capability of the receiving side, thereby eliminating waste, i.e., transmitting high-quality image data to even a receiving apparatus having a low color reproducing capability.

A preferred embodiment of the present invention will be described in detail below with reference to the accompanying drawings. An image communication apparatus of this embodiment is a facsimile apparatus which has a G3 facsimile communication function and is connected to an analog telephone line when it is used. A color image transmission/reception function is added to this apparatus.

FIG. 1 is a block diagram showing the arrangement of a color facsimile apparatus according to an embodiment of the present invention.

Referring to FIG. 1, a CPU 101 controls this apparatus as a whole. The CPU 101 uses a ROM 102 as a program memory to perform various control operations. A RAM 103 is used as a work area or the like of the CPU 101. The RAM 103 is backed up by a battery so that the stored contents are not erased when the apparatus is powered off.

A coding/decoding (CODEC) unit 104 has a raster-block conversion unit, color converter, and JPEG encoding unit as units constituting a transmission system, and a block-raster conversion unit, color converter, and JPEG decoding unit as units constituting a reception system. In encoding operation, upon reception of color component signals of R, G, and B (red (R), green (G), and blue (B) as multivalued signals each consisting of eight bits per pixel, the CODEC unit 104 can output JPEG baseline encoded data after converting the signals into L*, a*, and b* signal components. In decoding operation, upon reception of JPEG baseline encoded data, the CODEC unit 104 obtains L*, a*, and b* multivalued data each consisting of eight bits by decoding the input data, and then outputs the data upon conversion from the L*a*b* color space to the CMYK color space. That is, the CODEC unit 104 includes a JPEG encoder/decoder and color conversion circuits.

A modem 105 complies with the ITU-T recommendations V8/V34/V17/V29/V27ter, and modulates/demodulates transmission/reception signals. An NCU (Network Control Unit) 106 performs, for example, connection control with a telephone network 115. A timer circuit 107 includes, for example, a clock LSI having a calendar function, and measures a predetermined time, current date and time, and the like in accordance with instructions from the CPU 101. An operation panel 108 includes various operation keys and a display unit. An image memory 109 is formed by a semiconductor memory and controlled to store image data in units of pages. A color scanner 110 optically reads an original, separates the read data into R, G, and B components, and outputs each color pixel as 8-bit multivalued data. The color scanner 110 in this embodiment uses a color contact sensor as a read device, and has an ADF mechanism for automatically feeding an original to be read.

A printer interface (I/F) unit 111 has a binary processing unit and an interface control unit, and performs connection control with a printer unit 112 through a general-purpose interface 113 according to the Centronics specifications. Upon reception of multivalued signals of C, M, Y and K colors, the printer interface unit 111 converts each color data into binary data, and controls the general-purpose interface to transmit the data to the printer unit 112. The printer interface unit 111 also has the function of detecting the status of the printer unit 112 through the interface and notifying the CPU 101 of the status.

The printer unit 112 is capable of color printing and monochromatic printing by the ink-jet printing scheme. As ink cartridges that can be loaded into the printer unit 112, ink cartridges for monochromatic printing/color printing/high-resolution color printing and the like are available. The type of cartridge loaded can be recognized by the printer interface unit 111. Note that these units described above are connected through a CPU bus 114.

Assume that in this embodiment, the control programs shown in the flow charts of FIGS. 9 to 14 (to be described later) are stored in the ROM 102. However, these control programs may be supplied to this apparatus while being stored in a storage medium such as a floppy disk or CD-ROM, downloaded into the RAM 103, and executed by the CPU 101.

Figure 2:
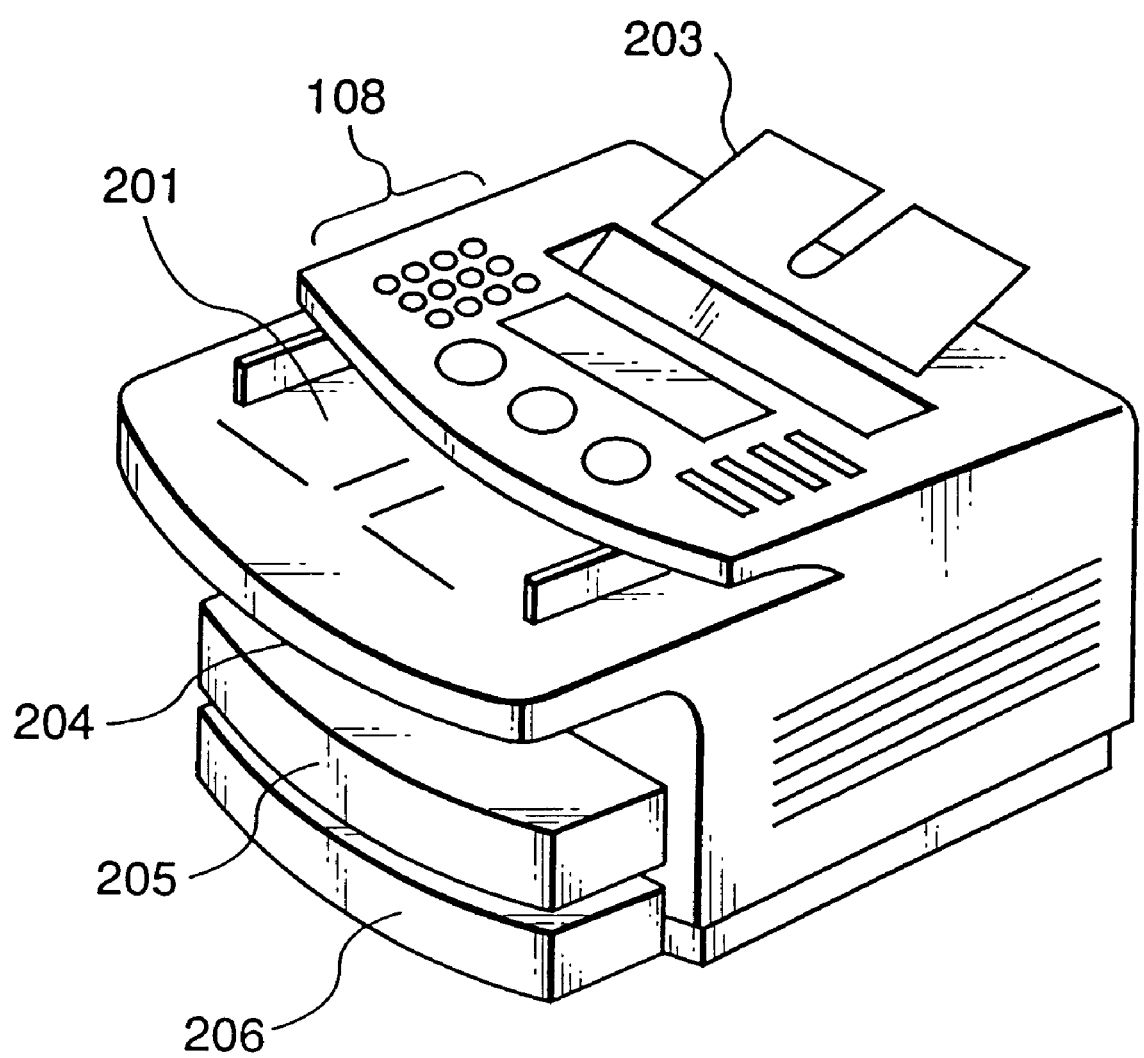
FIG. 2 is a perspective view of the color facsimile apparatus according to this embodiment.
Figure 3:
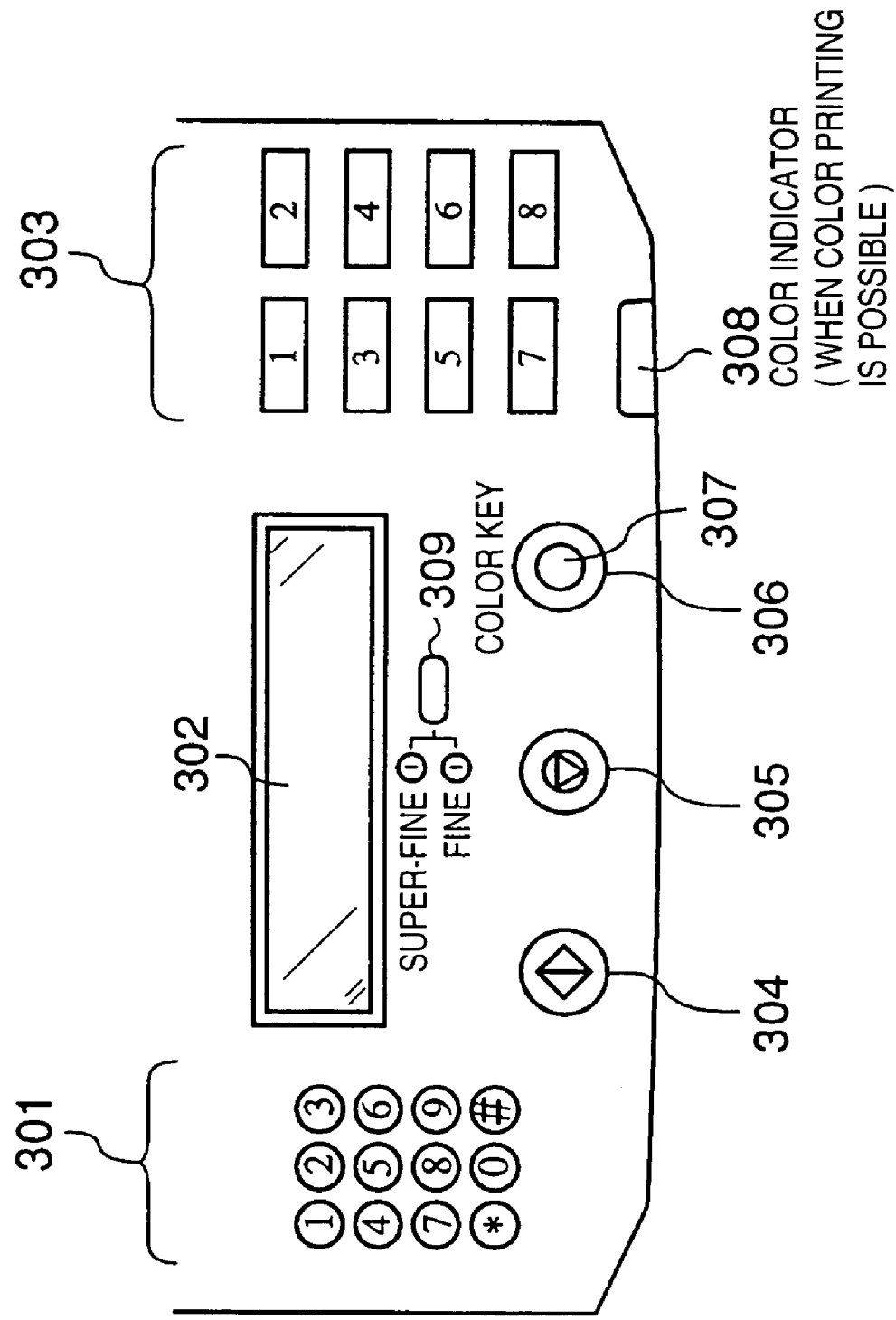
FIG. 3 is a plan view of the operation panel of the color facsimile apparatus of this embodiment.

FIG. 2 is a perspective view of the color facsimile apparatus of this embodiment. FIG. 3 is a plan view showing the outer appearance of the operation panel 108 of this color facsimile apparatus.

Referring to FIG. 2, an original table 201 on which an original is to be set is mounted on the upper surface of the casing of the apparatus. Slidable original guides are attached to the two sides of the original table 201 to prevent a ramp of an original when it is conveyed. In this embodiment, the size of an original placed on the original table 201 can be recognized by a sensor (not shown) for detecting the distance between (positions of) the original guides. The operation panel 108 is mounted on the upper surface of the original table 201, and an original discharge tray 203 onto which a read original is discharged is disposed behind the operation panel 108. A printing paper discharge unit 204 onto which a printed printing sheet is discharged is disposed on the front surface of the casing of the apparatus. First and second printing paper cassettes 205 and 206 in which printing sheets are set, are mounted on the lower surface of the casing of the apparatus. For example, A4-size sheets can be set in the first cassette 205, and postcard-size sheets can be set in the second cassette 206. This apparatus has a mechanism for recognizing the size and type of printing paper stored in each cassette. In this embodiment, the user operates the operation panel 108 to set the size of printing paper and the type of printing paper (plain paper/special color printing paper) stored in each cassette, thereby allowing the apparatus to recognize them. However, the present invention is not limited to this. For example, the apparatus may automatically recognize them by using a printing paper sensor or the like that can detect them.

Referring to FIG. 3, a ten-key pad 301 is made up of 12 types of keys, i.e., numeral keys "0" to "9" and function keys "#" and "*", and mainly used as a telephone number input means. An LCD display unit 302 performs display operation to display the status of the apparatus or check an input telephone number. A one-touch key 303 is used to perform one-touch transmission by reading out a destination number or the like written in the RAM 103 in advance. A start key 304 gives an instruction to start, for example, transmission or copying operation. A stop key 305 is used to stop operation during execution. A color key 306 is a key for designating a mode for processing an original as a color original. When the mode for processing an original as a color original is designated, a lamp 307 is turned on. When the key 306 is pressed while the lamp 307 is on, the lamp 307 is turned off and a mode in which an original is not processed as a color original is set. In this manner, every time the key 306 is pressed, the modes are alternately switched. A color indicator lamp 308 is kept on while a state in which color printing can be performed by the printer unit 112 is detected. A resolution selection key 309 is a key used to switch read resolutions in reading an original. Every time the key 309 is pressed, the resolutions are switched. By using the resolution selection key 309, the user can adjust the coarseness (resolution) of an image to be transmitted.

Figure 4:
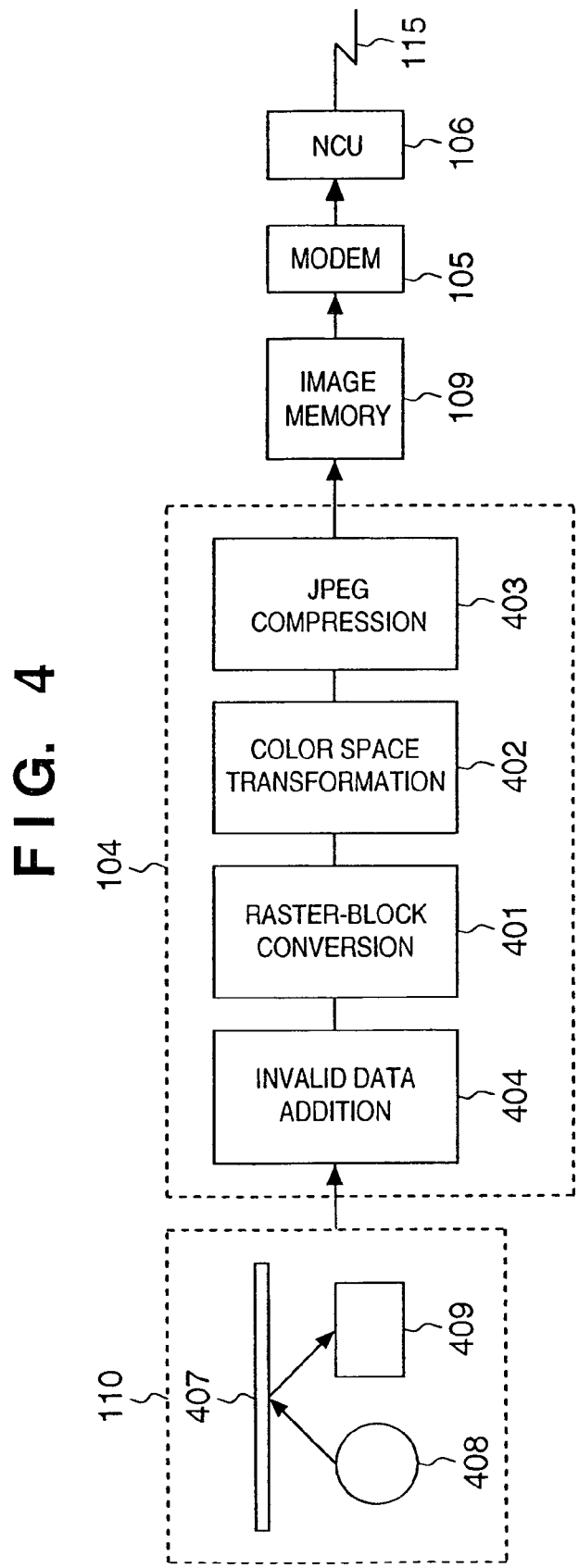
FIG. 4 is a block diagram showing the flow of data in image transmission in the color facsimile apparatus of this embodiment.
Figure 5:
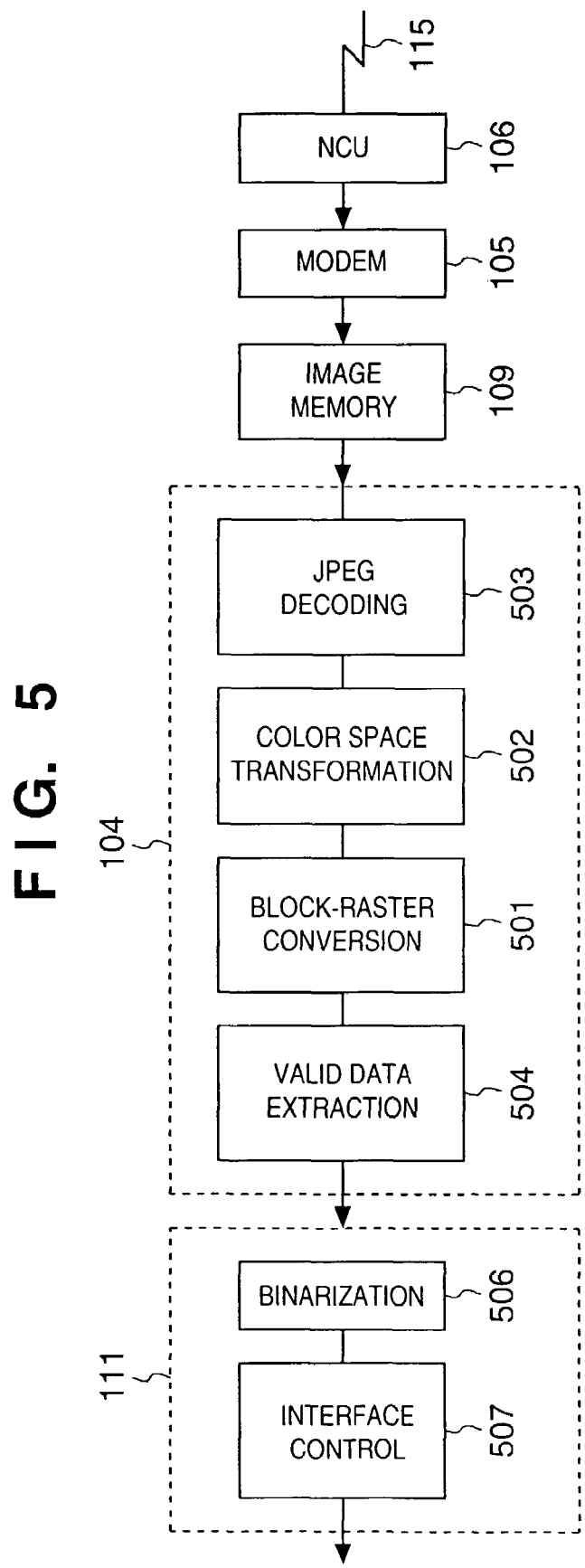
FIG. 5 is a block diagram showing the flow of data in image reception in the color facsimile apparatus of this embodiment.

FIG. 4 is a block diagram for explaining the flow of transmission image data in the color facsimile apparatus according to this embodiment. FIG. 5 is a block diagram for explaining the flow of reception image data in this apparatus.

In image data transmission shown in FIG. 4, an original 407 is irradiated with a while light source 408, and the reflected light from the original 407 is read by the scanner 110 including a color contact sensor 409. The scanner then converts each analog signal, separated into R, G, and B primary colors, into 8-bit digital data for each of R, G, and B, and outputs it to the CPU bus 114 (FIG. 1).

When this original is a color original, the read color image data is input to the CODEC unit 104 via the CPU bus 114. The CODEC unit 104 temporarily stores the image data in a buffer memory (not shown). In this case, if the original size is smaller than the page size defined by the ITU-T recommendation, blank data is added as invalid data to a portion which exceeds the original size so as to make the original data coincide with the defined minimum page size (404). This image data is then raster-block-converted by raster-block conversion 401. In this raster-block conversion 401, the respective 8-bit data transferred and stored as raster signals in the order of R, G, and B are rearranged into an 8 (pixels)×8 (pixels) block matrix, thereby generating block-sequential data arranged like R block, G block, B block, R block, . . . .

In this scanner 110, the back of the original 407 is supported by a white plate. If, therefore, the size of the original 407 is smaller than the standard size (the page size defined by the ITU-T recommendation), invalid data (blank data) based on light reflected by the white plate is automatically input in a portion outside the original 407.

Such block-sequential RGB data are subjected to known color space transformation operation in color space transformation 402 to obtain block-sequential L*a*b* data from the RGB data. In JPEG compression 403, this data sequence is JPEG-encoded. The JPEG-encoded image data is then output from the CODEC unit 104 to the image memory 109. The JPEG-encoded data is transferred to the modem 105 via the image memory 109, and transmitted from the NCU 106 to the telephone network 115.

The flow of image data in reception will be described next with reference to FIG. 5.

The image data received via the telephone network 115, NCU 106, and modem 105 is temporarily stored in the image memory 109. The data is then transferred from the image memory 109 to the CODEC unit 104.

First of all, the CODEC unit 104 decodes the received JPEG-encoded data by JPEG baseline decoding 503 to obtain block-sequential L*a*b* data, and then converts the data into block-sequential data of CMY (Cyan/Magenta/Yellow) color space by color space transformation 502. The CODEC unit 104 sequentially converts the block-sequential CMY data into raster data sequences of C, M, and Y colors by block-raster conversion 501, extracts a valid image data area on the buffer memory (504), and outputs it to the printer interface unit 111. The printer interface unit 111 extracts a black component by computing each input data sequence, and separates it into data of C, N, Y, and K colors. The printer interface unit 111 then binarizes (506) each data and transfers the binary data to the printer unit 112 via an interface control unit 507.

Of the processes described above, the method of generating binary raster data of C, M, Y, and K colors from multivalued L*a*b* block data is well known.

Figure 6:
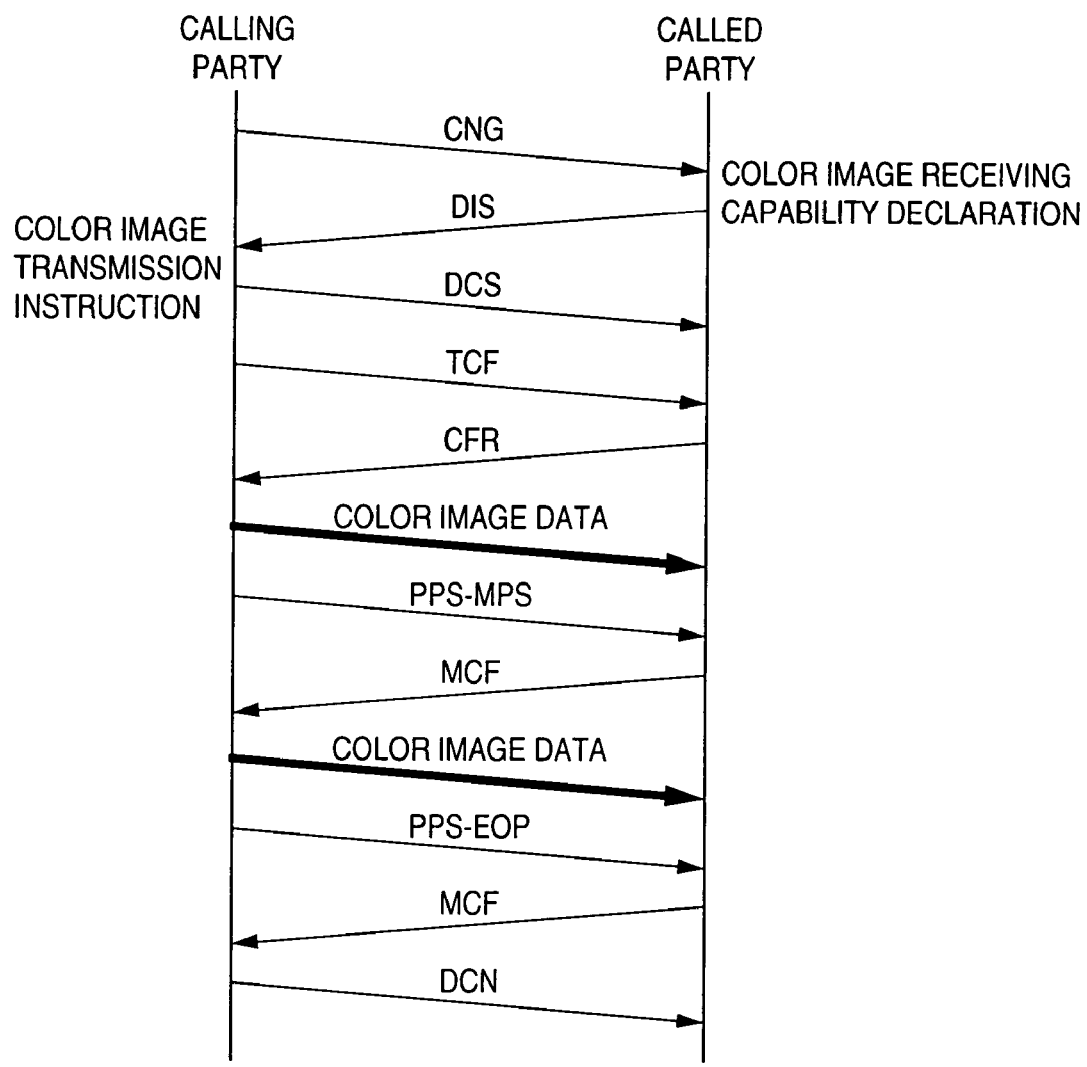
FIG. 6 is a view for explaining an example of a color communication procedure in the color facsimile apparatus of this embodiment.

FIG. 6 is a view for explaining an example of a communication procedure in the color facsimile apparatus according to this embodiment, and shows the basic flow of processing complying with the ITU-T recommendation T30.

In phase B, the called party (receiving side) declares "color image receiving capability" as a capability of the self-terminal by using a DIS signal. With this operation, the calling party (transmitting side) confirms "color receiving capability" of the called party (receiving side), and designates "color image transmission" by a DCS signal. In phase C, the transmitting side transmits the JPEG baseline encoded/compressed color image data in units of ECM blocks.

Figure 7:
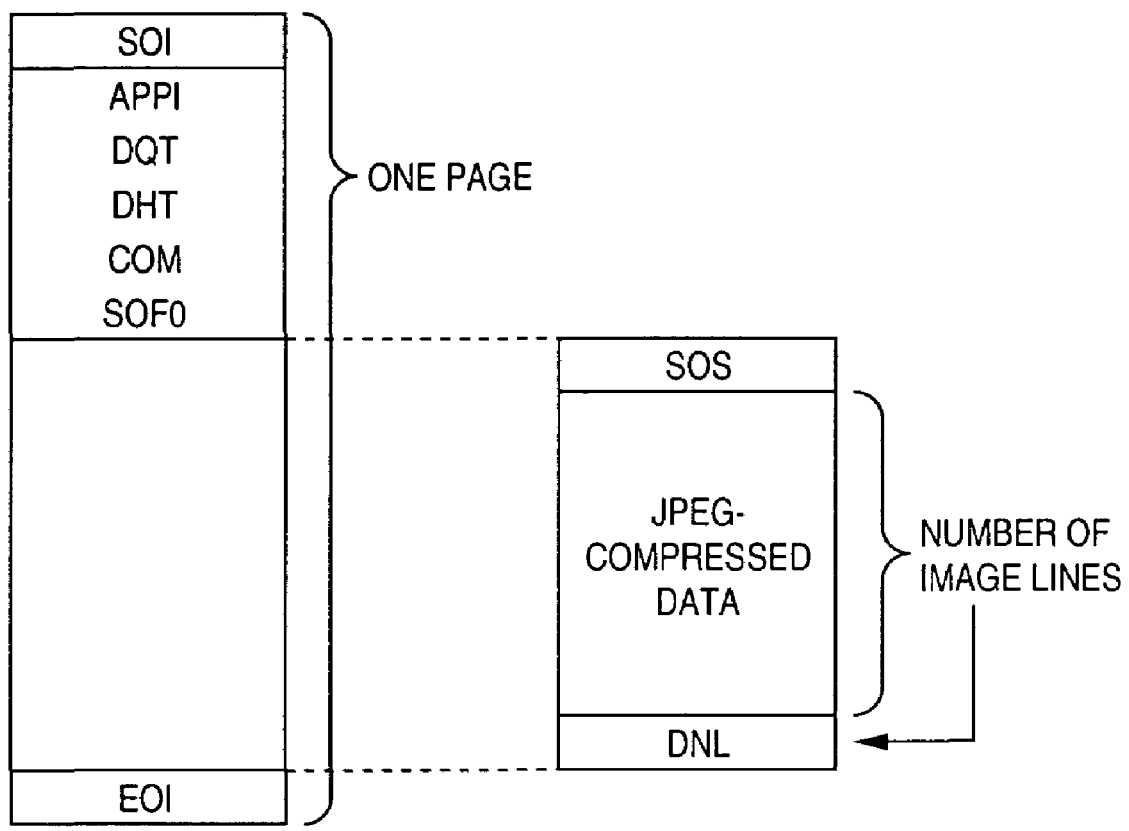
FIG. 7 is a view for explaining the data structure of JPEG baseline encoded data in this embodiment.

FIG. 7 is a view for explaining an example of the data structure of JPEG baseline encoded data in color image communication defined by the ITU-T recommendations T4 and T81.

One-page data is made of the image frame data set between SOI and EOI markers. This image frame is separated into a so-called JPEG header portion including, for example, APP1, DQT, DHT, COM, and SOF0 markers following the SOI marker, and a JPEG compressed data portion starting with an SOS marker.

In the color image communication procedure defined by the ITU-T recommendations T30 and T4, the usage of the APP1 marker is defined as G3FAX. The DQT marker defines a quantization table in JPEG compression. With this quantization table, the image compression ratio and image quality are changed. The DHT marker defines a Huffman table. The COM maker is a marker written in a comment, and is defined by the ITU-T recommendation T4 as a marker that can be neglected in decoding. The SOF marker defines various parameters in baseline DCT compression. These parameters include the main scanning pixel count and sub-scanning pixel count of image data.

If the sub-scanning pixel count is indefinite in JPEG-compressing image data owing to the arrangement of the facsimile apparatus, "0" is set as the sub-scanning pixel count on the SOF0 marker, and the sub-scanning pixel count of the compressed image data can be set again by a DNL marker after the compressed data starting with the SOS marker.

Figure 8:
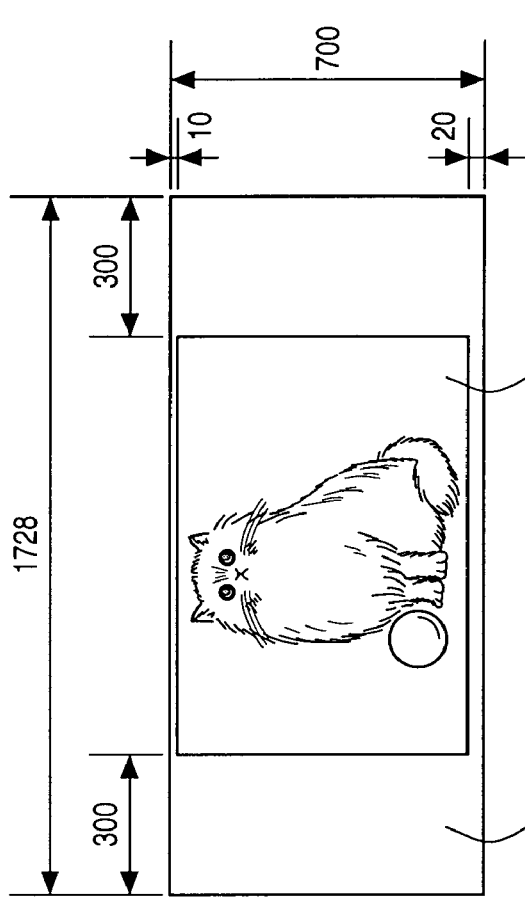
FIG. 8 is a view for explaining COM marker parameters in this embodiment.

FIG. 8 is a view for explaining an example of how the COM marker is used to designate a valid image area in the facsimile apparatus according to this embodiment.

According to the ITU-T recommendations T30 and T4, the size of one page in the main scanning direction in color image communication is defined as A4/B4/A3. For example, the main scanning length of image data that is JPEG-compressed in A4 and 200 dpi is defined as 1,728 pixels. If an original to be actually transmitted is shorter than the width of an A4-size sheet, the transmitting side can notify the receiving side of a valid image size in compliance with the ITU-T recommendation by designating a valid image area using this COM marker.

Referring to FIG. 8, for the transmission image data area (1,728 pixels (horizontal)×700 pixels (vertical)) designated by SOF0, the COM marker is used to designate upper, lower, left, and right invalid portions (marginal portions: TOP (upper side): 10, LEFT, RIGHT (left and right sides): 300, and BOTTOM (lower side): 20 in the case shown in FIG. 8) of the transmission image data area designated by the SOF0 marker, thereby making the receiving side recognize a valid image area of the transmission image data area.

Figure 9:
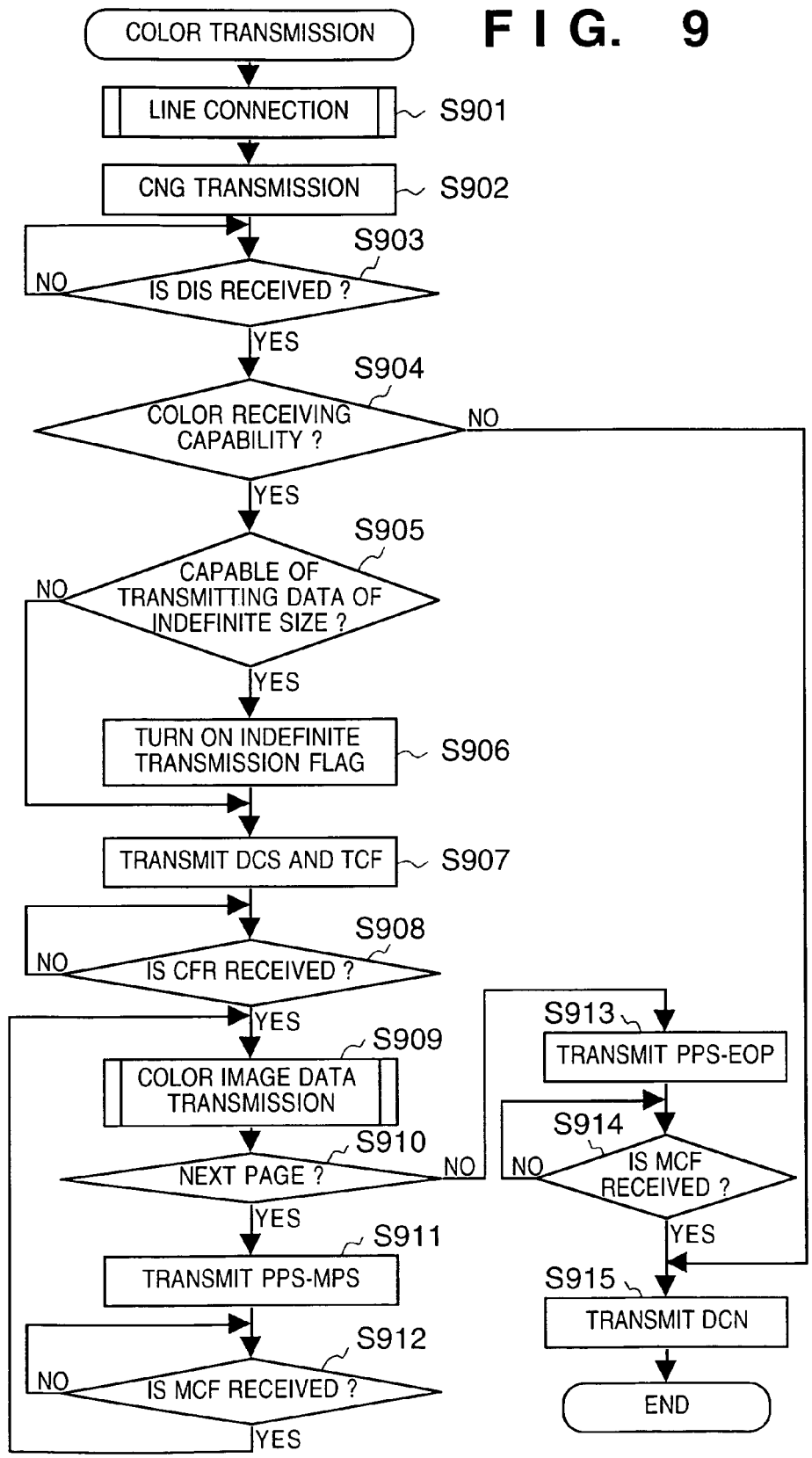
FIG. 9 is a flow chart showing transmission (calling party) processing in the color facsimile apparatus of this embodiment.

FIG. 9 is a flow chart showing processing to be performed when the color facsimile apparatus according to this embodiment serves as a transmitting side (calling party). Note that a program for executing this processing is stored in the ROM 102.

In step S901, the transmitting apparatus originates a call to the destination by using a dialing number stored in the RAM 103 or operating the ten-key pad 301, thereby establishing line connection. In step S902, the transmitting apparatus transmits CNG. If DIS is received in step S903, the flow advances to step S904 to determine the color receiving capability of the receiving apparatus as the called party. If the receiving apparatus has no color receiving capability, the flow advances to step S915 to transmit DCN and perform error termination.

If the receiving apparatus has a color receiving capability, the flow advances from step S904 to step S905 to check whether the receiving apparatus as the called party according to this embodiment has the capability of receiving color image of an indefinite size. In this step, it is checked whether the receiving apparatus has declared, with the DIS signal, information indicating that it can receive any color image of a main scanning length (indefinite size) smaller than the standard size declared by DIS as a maximum value. If the receiving apparatus has the capability of receiving a color image of an indefinite size, the flow advances to step S906 to turn on an indefinite size transmission enable flag (set in the RAM 103) indicating that transmission can be performed in an indefinite size to the receiving apparatus. With this operation, in transmitting an original of a size smaller than a standard size to the receiving apparatus, the transmitting apparatus can transmit a color image without adding useless, invalid data to it in a transmission phase of the color image data, thus shortening the communication time.

Assume that it is determined in step S905 that the receiving apparatus does not have the capability of receiving a color image of an indefinite size, or the flow advances from step S906 to step S907 in which information designating color image transmission is received, and the indefinite size transmission enable flag described above is turned on to transmit the indefinite-size image. In this case, the transmitting apparatus transmits DCS having information designating indefinite-size image transmission to the receiving apparatus, and then transmits TCF. Thereafter, the flow advances to step S908. If CFR is received from the receiving apparatus, the flow advances to step S909 to perform transmission processing for a 1-page color image (refer to FIG. 6 for these procedures). The processing in step S909 will be descried in detail later with reference to the flow chart of FIG. 10.

Subsequently, the flow advances to step S910 to check whether there is transmission data of the next page. If the image data of the next page is present, the flow advances to step S911 to transmit PPS-MPS. The flow advances to step S912 to wait for the reception of MCF. The flow then returns to the processing in step S909.

If it is determined in step S910 that there no transmission data of the next page, the flow advances to step S913 to transmit PPS-EOP. The flow advances to step S914 to wait for the reception of MCF. The flow then advances to step S915 to transmit DCN, thereby terminating the processing.

Figure 10:
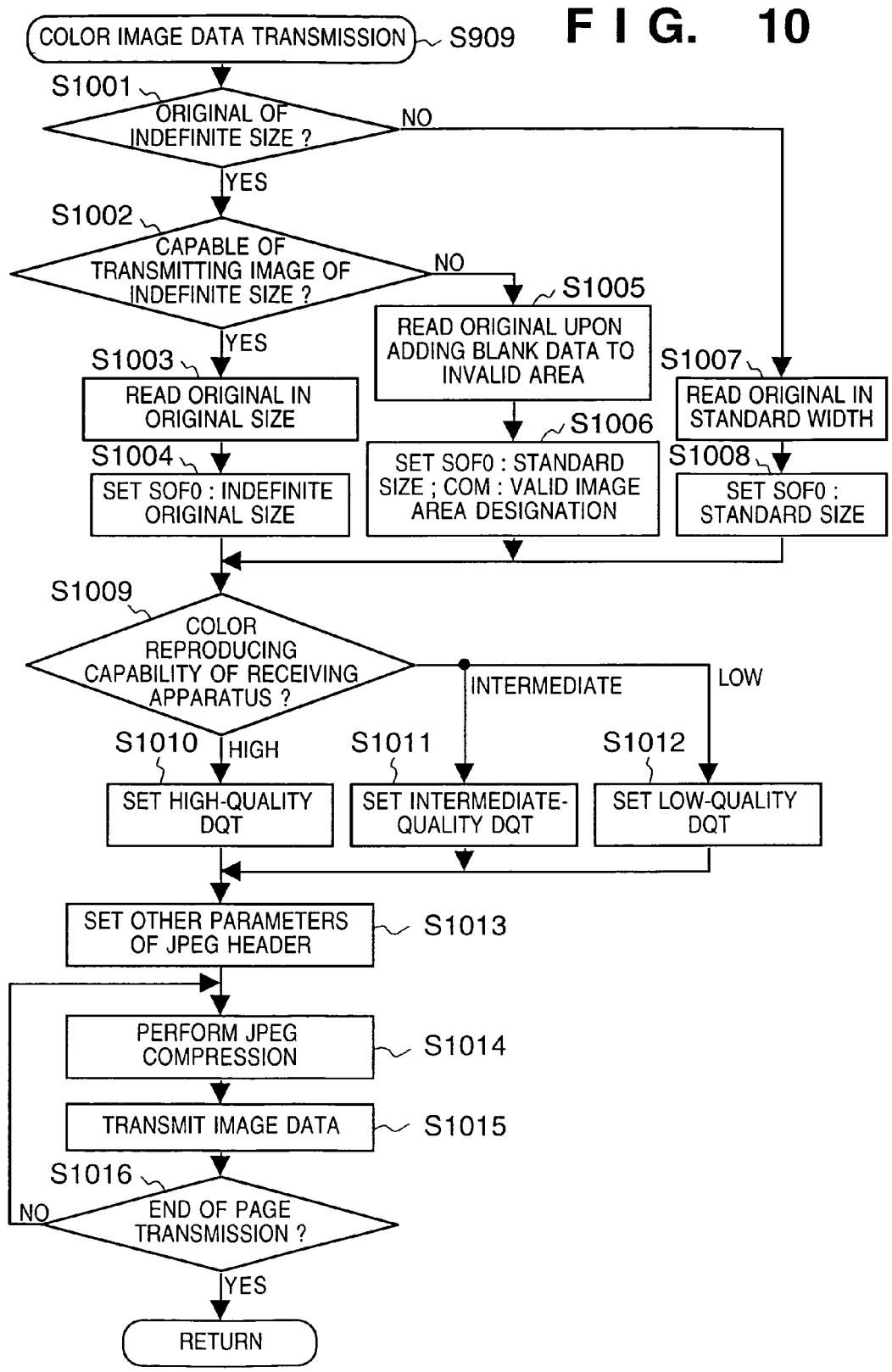
FIG. 10 is a flow chart showing color image transmission processing in step S909 in FIG. 9.

FIG. 10 is a flow chart showing color image transmission processing in step S909 described above.

In step S1001, it is checked whether the size of a transmission original is a standard size such as A4 size that is commonly handled in facsimile apparatuses. In this embodiment, several different original widths are detected by an original width sensor (not shown) for detecting the set positions of the original guides described above. If the size of the original is a standard size (e.g., A4), the flow advances to step S1007 to instruct the color scanner 110 to read the original in the standard original width. In step S1008, the SOF0 marker of a JPEG header is set to the standard size (A4).

If it is determined in step S1001 that the size of the transmission original is indefinite, the flow advances to step S1002 to check, on the basis of the indefinite size transmission enable flag set in the RAM 103 in step S906, whether the receiving-apparatus is capable of receiving color image data of an indefinite size. If the receiving apparatus can receive data of an indefinite size, the flow advances to step S1003 to instruct the color scanner 110 to read the original image in the original width obtained by the original width detector. In step S1004, the SOF0 marker of the JPEG header is set to the read original width.

If it is determined in step S1002 that the receiving apparatus cannot receive data in an indefinite size, the flow advances to step S1005 to execute read control such that blank data is added to the image data read in the original width obtained by the original width detector so as to increase the original size to a standard size. In step S1006, the standard size is set as the SOF0 marker of the JPEG header, and information indicating a valid image area is set in the COM marker.

After one of steps S1004, S1006, and S1008 is executed in this manner, the flow advances to step S1009 to recognize the color reproducing capability information of the receiving apparatus from the information of the received DIS signal. In this case, information consisting of several bits is assigned for the declaration of this color reproducing capability so as to express a color reproduction capability in several stages. In this embodiment, three quantization tables are switched in accordance with the color reproducing capability information of the receiving apparatus. More specifically, the transmitting apparatus generates a DQT marker for selecting a quantization table such that a quantization table that trades off compression ratio for improved image quality is selected for a receiving apparatus capable of printing high-quality images; a quantization table that trades off image quality for increased compression ratio, for a receiving apparatus that can print only low-quality images; and a quantization table by which intermediate-quality images can be obtained, for a receiving apparatus capable of printing intermediate-quality images (steps S1010, S1011, and S1012).

When any one of steps S1010, S1011, and S1012 is complete, the flow advances to step S1013 to set other necessary markers (APP1, DHT, and the like) of the JPEG header. The image data obtained from the scanner 110 is subjected to raster-block conversion, color space transformation, and JPEG compression in the CODEC unit 104 (step S1014). The JPEG-encoded image data is transmitted (step S1015). Steps S1014 and S1015 are repeated until it is determined in step S1016 that transmission of 1-page image data is complete. When the transmission of 1-page image data is complete, this processing is terminated.

Figure 11:
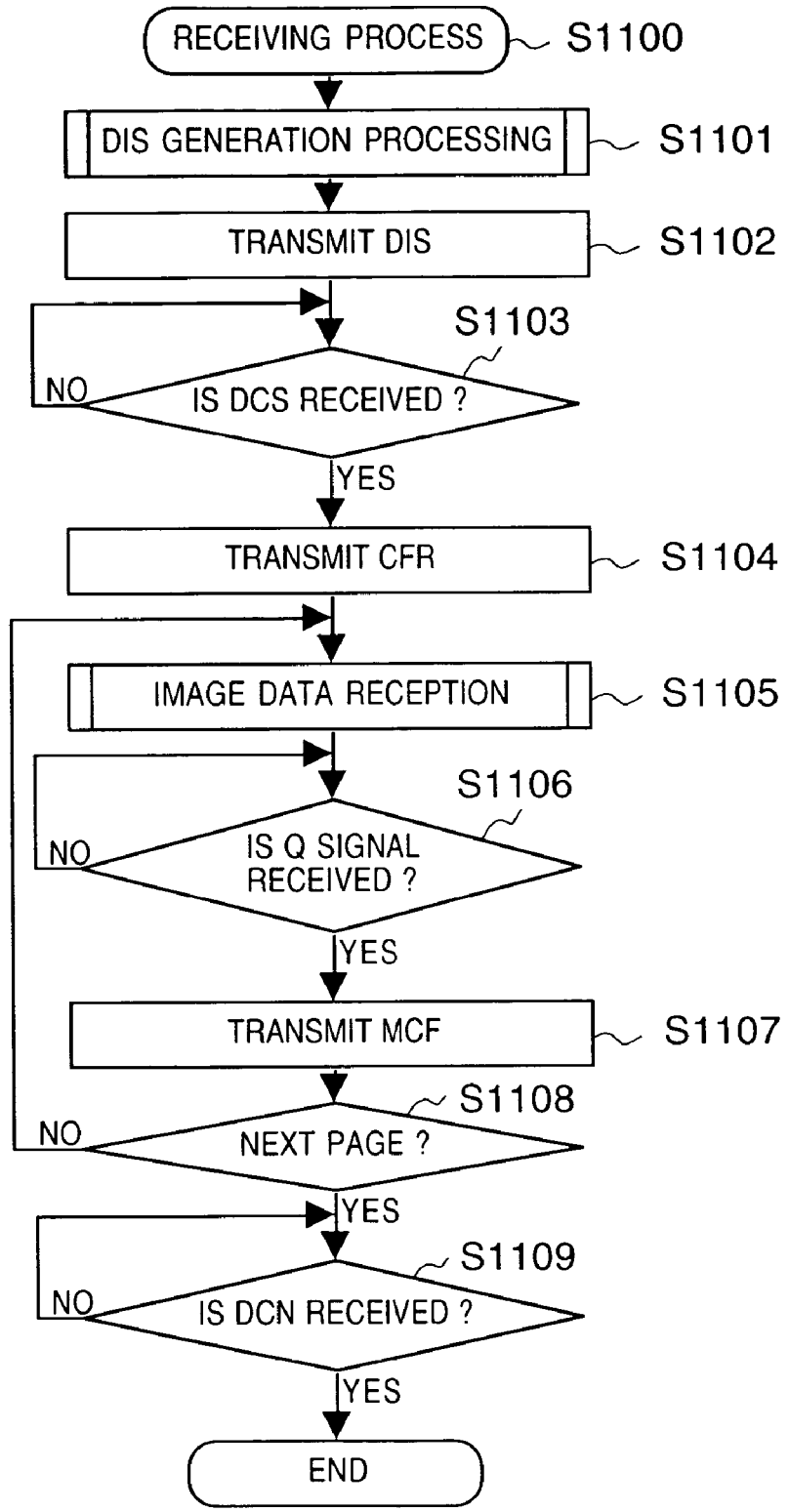
FIG. 11 is a flow chart showing image reception (receiving side) processing in the color facsimile apparatus of this embodiment.
Figure 12:
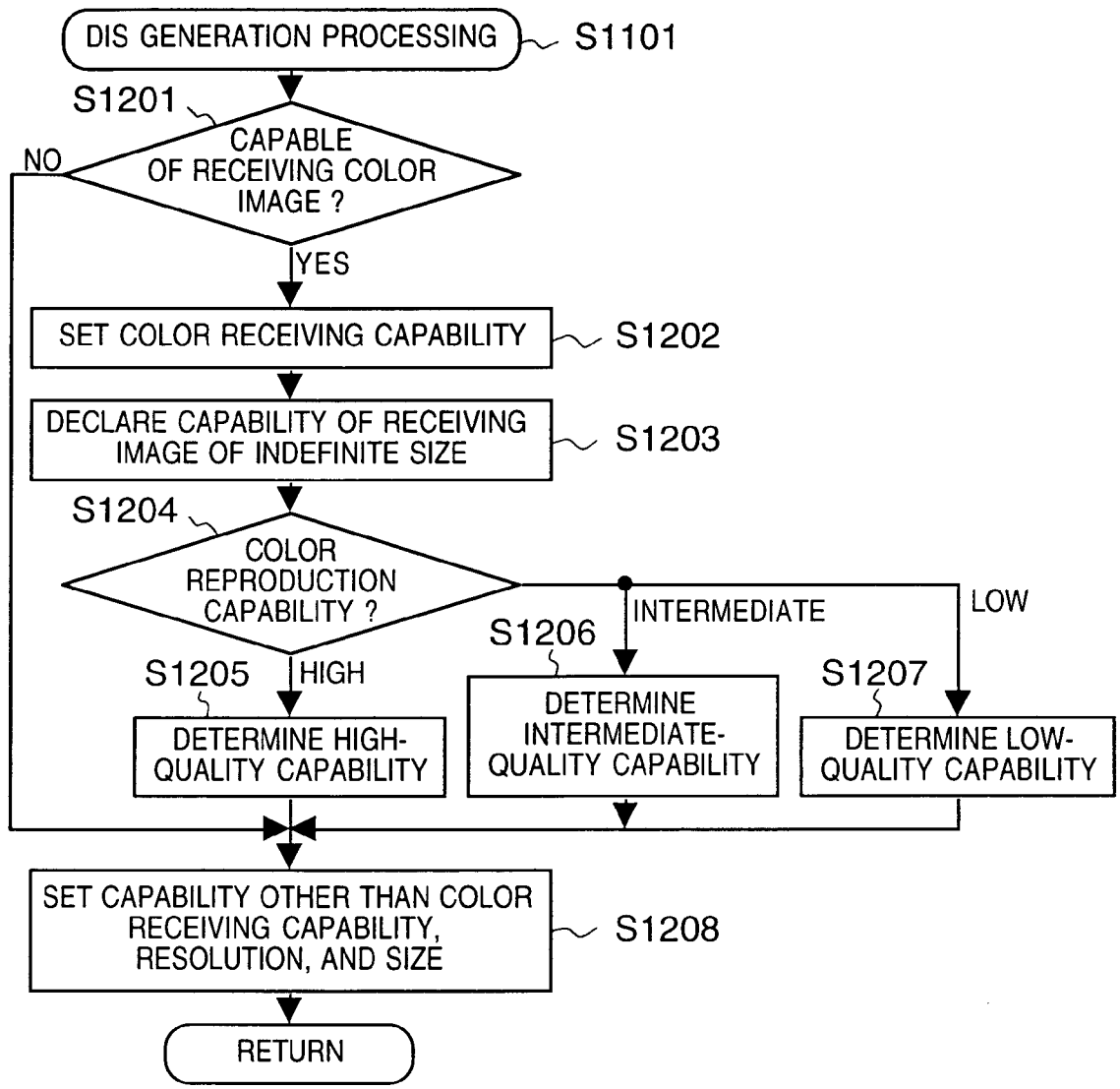
FIG. 12 is a flow chart showing DIS signal generation processing in step S1101 in FIG. 11.
Figure 13:
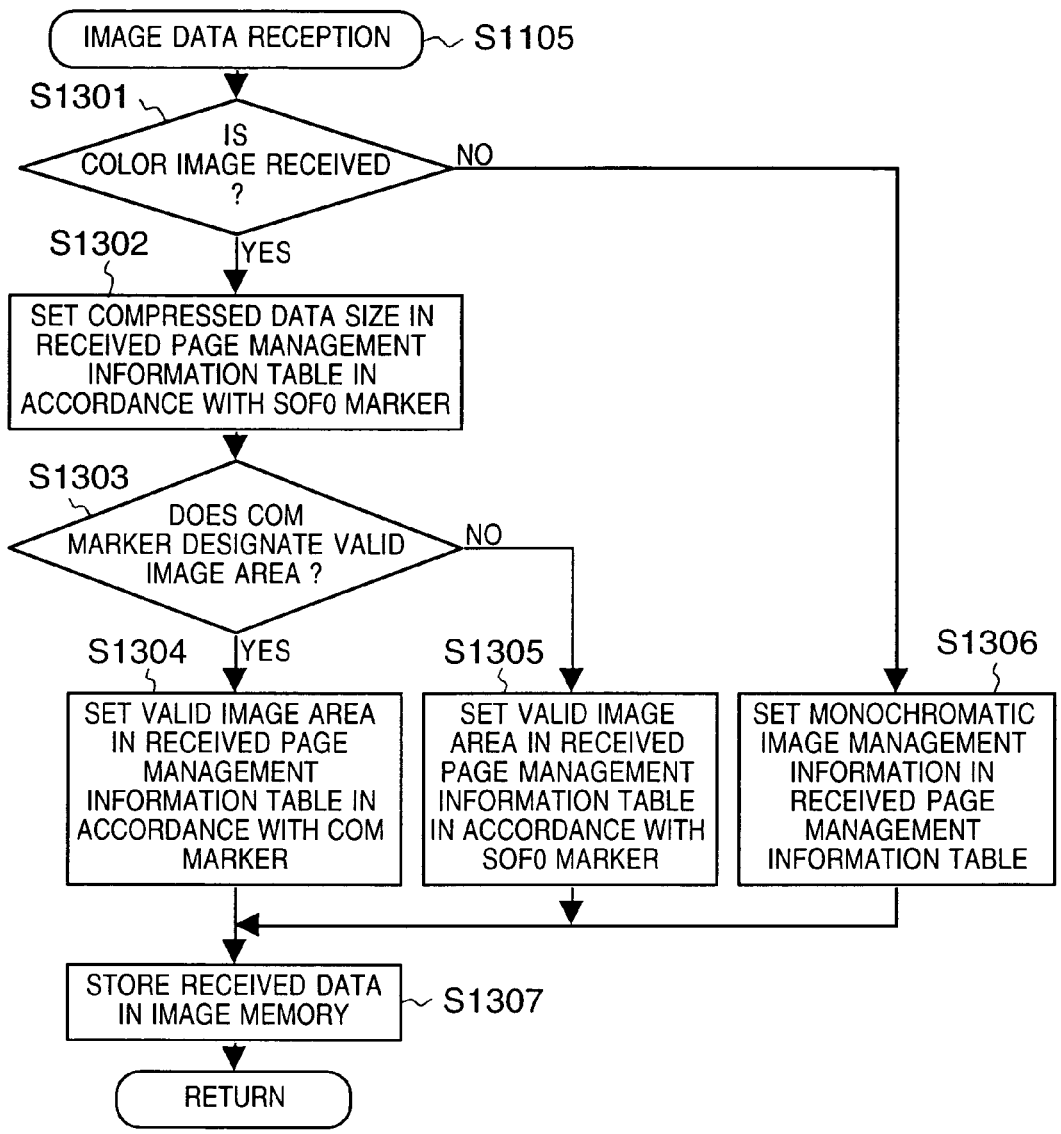
FIG. 13 is a flow chart showing image data reception processing in step S1105 in FIG. 11.

FIGS. 11, 12, and 13 are flow charts showing processing to be performed when the color facsimile apparatus of this embodiment receives image data. A control program for executing this processing is stored in the ROM 102.

FIG. 11 shows a flow chart showing reception processing in the color facsimile apparatus of this embodiment.

When a response to an incoming call is sent in step S1100, the flow advances to step S1101 to execute DIS signal generation processing (to be described later with reference to the flow chart of FIG. 12). In step S1102, a DIS signal is transmitted. The flow then advances to step S1103 to wait for reception of a DCS signal from the transmitting facsimile apparatus (calling party). If an image signal can be received, a CFR signal is transmitted (step S1104). With this operation, the transmitting apparatus starts transmitting image data, and the image data is received (this operation will be described later with reference to the flow chart of FIG. 13). The received image data is stored in the image memory 109 (step S1105).

If it is determined in step S1106 that a Q signal is received from the transmitting side, the flow advances to step S1107 to transmit an MCF signal indicating acknowledgement of reception. In step S1108, it is checked on the basis of the Q signal whether there is image data of the next page. If YES in step S1108, the above processing is repeated from step S1105 or step S1102. If NO in step S1108, the flow advances to step S1109 to wait for reception of a DCN signal sent from the transmitting side. The communication processing is then terminated.

FIG. 12 is a flow chart showing the DIS signal generation processing in step S1101 in FIG. 11.

In step S1201, it is checked whether the receiving apparatus has a color receiving capability. In this embodiment, this step is performed by checking whether a color ink cartridge is loaded into the printer unit 112. If NO in step S1201, the flow skips to step S1208 to set a parameter for the declaration of a receiving capability other than the color receiving capability in a DIS signal.

If YES in step S1201, the flow advances to step S1202 to set a parameter indicating a color receiving capability in the DIS signal. The flow then advances to step S1203 to set a bit for declaring the capability of receiving a JPEG file of a main scanning pixel count smaller than that of a standard size such as A4 defined in the DIS signal. This capability is a characteristic feature of this embodiment. The flow advances to step S1204 to determine a color reproducing capability in color printing depending on whether a high-resolution color ink cartridge or general color ink cartridge is mounted into the printer unit 112 and whether plain paper or special color printing paper is set in the paper cassettes 205 or 206. In this case, color reproducing capabilities are classified into a high-quality capability, intermediate-quality capability, and low-quality capability according to these conditions. On the basis of the classification result, the capability determined in step S1204 is set in the bit for declaring the color reproducing capability information defined in the DIS signal in one of steps S1205, S1206, and S1207. The flow then advances to step S1208 to set a parameter for the declaration of a receiving capability other than the color receiving capability in the DIS signal, thus terminating this DIS signal generation processing.

Assume that when a high-resolution color ink cartridge is mounted, and special color printing paper is stored in the paper cassette (205 or 206), the high-quality color reproducing capability is determined. Similarly, when only one of the conditions that a high-resolution color ink cartridge is mounted and special color printing paper is stored in the paper cassette is satisfied, the intermediate-quality color reproducing capability is determined. When neither of the conditions is satisfied, the low-quality color reproducing capability is determined.

FIG. 13 is a flow chart showing the image data reception processing in step S1105 in FIG. 11. FIG. 15 is a view for explaining a received page management information table stored in the RAM 103 of the facsimile apparatus according to this embodiment.

In step S1301, the information of a received DCS signal is analyzed to check whether image data to be received is a color image. If NO in step S1301, i.e., the image data is a monochromatic binary image used in a general facsimile apparatus, the flow advances to step S1306 to set a page data type, page resolution, page data main scanning pixel count, and valid data area in a page management information table (see FIG. 15), which is used to manage stored image data, by processing similar to that in the prior art.

More specifically, the encoding scheme (MH, MR, MMR, or the like) and resolution of the data to be received, which are obtained by analyzing the DCS signal, are set as a page data type (DATA_TYPE) and page resolution (RESOLUTION). Likewise, the main scanning length of a page, which is obtained by analyzing the DCS signal, is set at a page data main scanning pixel count (PAGE_H_SIZE). In addition, both an upper end (TOP) and left end (LEFT) as valid data start positions are set to "0". A valid data main scanning pixel count (VALID_H_SIZE) is set to the same value as that of the page data main scanning pixel count (PAGE_H_SIZE). A page data sub-scanning pixel count (PAGE_V_SIZE) and valid data sub-scanning pixel count (VALID_V_SIZE) are set when reception of image data is complete.

When a color image is to be received, the flow advances to step S1302 to set a page data type, page resolution, page data main scanning pixel count, and the like in the page management information table (see FIG. 15) for managing stored image data.

More specifically, JPEG encoding is set as a page data type (DATA_TYPE), and the resolution obtained by analyzing DCS is set as a page resolution (RESOLUTION). The JPEG header of a JPEG file to be received is analyzed, and the image sizes (main scanning pixel count and sub-scanning pixel count) of received image data which is designated by an SOF0 marker are set as a page data main-scanning pixel count (PAGE_H_SIZE) and a page data sub-scanning pixel count (PAGE_V_SIZE) (step S1302). If it is determined in step S1303 that the JPEG header includes a COM marker, it is checked whether the valid image area of the JPEG compressed data portion which is designated by the COM marker is set. If a valid image area is designated, the flow advances to step S1304 to set a valid data start position (upper end (TOP)/ left end (LEFT)) and valid data main scanning and sub-scanning pixel counts (VALID_H_SIZE and VALID_V_SIZE) in the page management information table in accordance with the valid image area information designated by the COM marker.

If it is determined in step S1303 that the valid image area of the JPEG-compressed data portion is not set by the COM marker, the flow advances to step S1305 to set both the valid data start positions (upper end/left end) in the page management information table to "0" and also set valid data main and sub-scanning pixel counts to the same values as those of the page data main and sub-scanning pixel counts. When one of steps S1304, S1305, and S1306 is executed, the flow advances to step S1307 to store received image data in the image memory associated with the page management information table.

Figure 14:
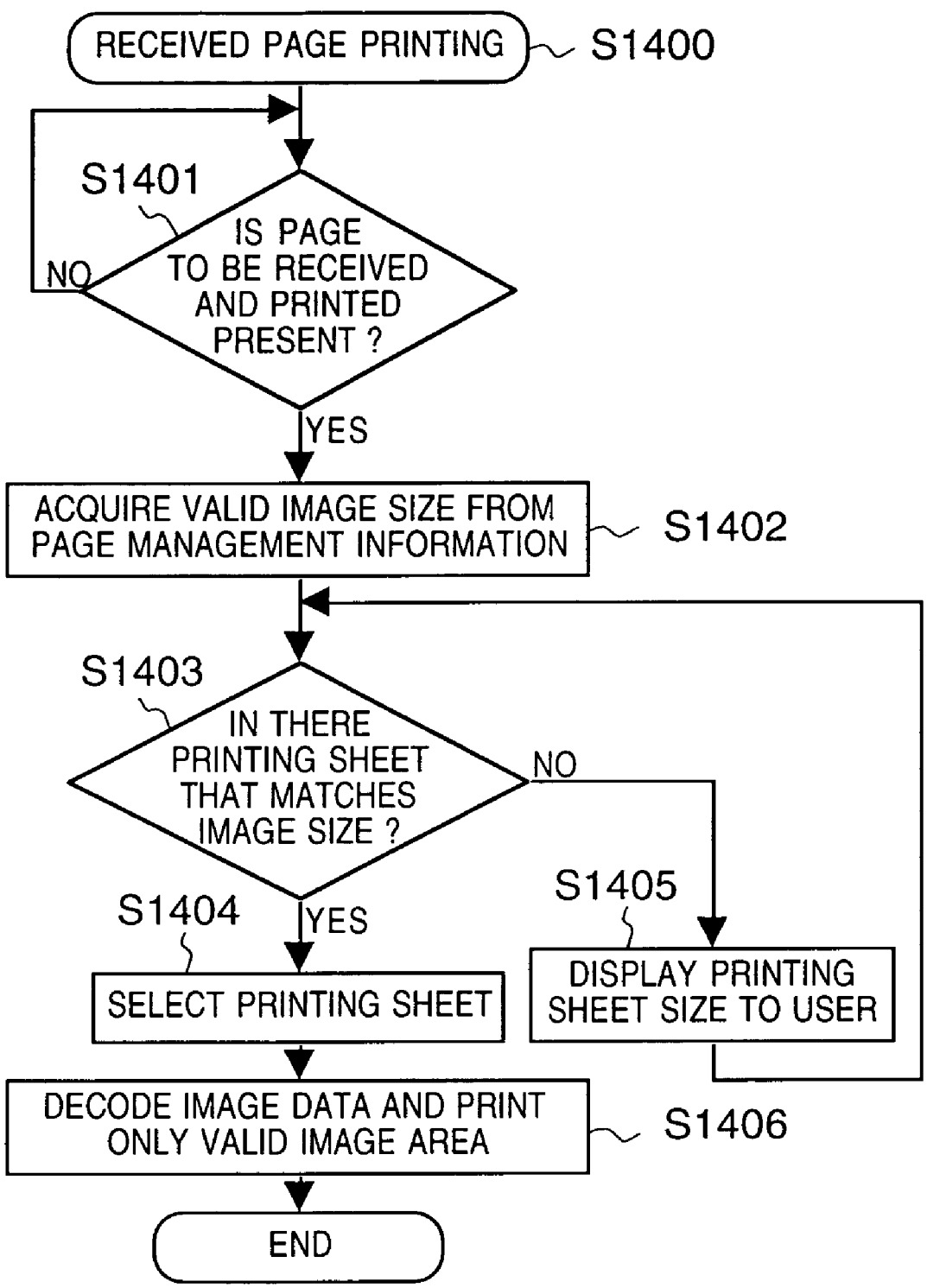
FIG. 14 is a flow chart showing printing processing for a received page in the color facsimile apparatus of this embodiment.

FIG. 14 is a flow chart showing operation to be performed when image data received in units of pages in the above manner is output to the printer unit 112 to be printed.

In step S1401, it is checked whether there is a page management information table to be received and printed. If there is a received page to be printed, the flow advances to step S1402 to recognize the size of a valid image which is obtained from the page resolution and valid data main and sub-canning pixel counts in the page management information table. The flow then advances to step S1403 to check whether a printing sheet having a size suitable for printing of the image data is set in the paper cassette (205 or 206) of the printer unit 112. If NO in step S1403, the flow advances to step S1405 to display information on the LCD 302 of the operation panel 108 or the like to prompt the user to set a printing sheet having a corresponding size. The flow then returns to step S1403. If a proper printing sheet is set, the flow advances to step S1404 to control feeding of the printing sheet from the paper cassette. In step S1406, the received image data in the image memory 109 associated with the page management information table is decoded, and its valid image area is extracted, thus executing a printing process.

In the above description of this embodiment, the following are defined in the DIS signal according to the ITU-T recommendation T30:

(1) information declaring that any image data having a main scanning size equal to or smaller than the main scanning size (A4/A4 or B4/A4, B4, or A3) defined by the recommendation T30 as a maximum value when it is declared; and (2) color reproducing capability information for notifying the transmitting side of the color image reproducing capability of the receiving side when a color image is output in printing or display operation on the receiving side.

The two methods of additionally defining information have been described above. However, these pieces of information as an NSF signal can also be defined as information in a nonstandard procedure.

Note that the present invention may be applied to either a system constituted by a plurality of devices (e.g., a host computer, an interface device, a reader, a printer, and the like), or an apparatus consisting of a single device (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus. In this case, the program code itself read out from the storage medium realizes the functions of the above-mentioned embodiments, and the storage medium which stores the program code constitutes the present invention. The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As has been described above, according to this embodiment, this apparatus includes the means for identifying the size of an original to be read when a color image is transmitted. With this means, when an original of a page size smaller than the main scanning length of a page defined in a communication procedure by the recommendation T30 is transmitted, the original is read after invalid data is added to the original to set its size to the main scanning length of the minimum page size defined in the communication procedure according to the recommendation T30 in reading the original. When this color image data is JPEG-compressed, the valid image area of the compressed data is set by using a comment marker or the like within a JPEG header, thereby allowing the receiving apparatus to recognize the valid image area. This allows the receiving apparatus to select a printing sheet having a suitable size for printing, thus eliminating waste, i.e., printing a valid image on only a portion of a large printing sheet.

According to the communication procedure, JPEG-compressed image data is transmitted in a format equivalent to the format defined by the ITU-T recommendation T30 except that a comment marker is added. According to this recommendation, a comment marker is a portion that can be arbitrarily set. For this reason, even another color facsimile apparatus that does not have the function of this embodiment can receive and print image data transmitted from the facsimile apparatus of this embodiment without any trouble.

In addition, blank data is used as invalid data to be added to an original (to be read) to make its original size equal to the main scanning length of a page defined in the communication procedure according to the recommendation T30. This makes the JPEG-compressed image data equivalent to data obtained by adding minimum necessary data to valid image data, thereby saving the communication time.

In addition, according to this embodiment, when the main scanning size (A4/A4, B4/A4, B4, or A3) defined by the recommendation T30 is declared as the main scanning size of image data that can be received and is declared on the receiving side, information declaring that any image data having a main scanning size equal to or smaller than the declared as a maximum value can be received is defined in a DIS signal according to the ITU-T recommendation T30. With this operation, since image data having an arbitrary size within the maximum original size declared on the receiving side can be transmitted, no invalid image data is transmitted.

In addition, color reproducing capability information for notifying the transmitting side of the color image reproducing capability of the receiving side when a color image is output in printing or display operation on the receiving side is defined in a DIS signal according to the ITU-T recommendation T30, thereby allowing the transmitting side to select an optimal compression parameter that defines the quality of image data to be transmitted. This makes it possible to eliminate waste, i.e., transmitting high-quality image data to even a receiving apparatus having a low color reproducing capability.

The present invention is not limited to the above embodiments and various changes and modifications can be made within the spirit and scope of the present invention. Therefore, to apprise the public of the scope of the present invention, the following claims are made.

What is claimed is:

1. An image communication apparatus for transmitting a color image according to at least one ITU-T recommendation to a receiving apparatus, comprising:

original read means for generating image data by reading an original;

identification means for identifying a paper size of the original read by said original read means;

compression means for compressing the image data; and control means for, in a case where the paper size of the original identified by said identification means is smaller than a paper size defined by the recommendation, causing said original read means to read the original in the paper size of the original, adding invalid data to the image data, causing said compression means to compress the image data to which the invalid data is added, and performing control processing to designate the paper size of the original and valid data in the image data compressed by said compression means, in a case where the image data compressed by said compression means is transmitted to the receiving apparatus.

2. The apparatus according to claim 1, further comprising determination means for determining whether the receiving apparatus has a receiving capability of receiving image data of the paper size smaller than the paper size defined by the recommendation, and wherein said control means designates the paper size of the original with respect to the receiving apparatus in a case where said determination means determines that the receiving apparatus has the receiving capability.

3. An image communication method performed by an image communication apparatus for transmitting a color image according to at least one ITU-T recommendation to a receiving apparatus, the method comprising:

an identification step of identifying a paper size of an original;

a reading step of reading the original in the paper size of the original and generating image data, in a case where the paper size of the original identified in said identification step is smaller than a paper size defined by the recommendation;

an addition step of adding invalid data to the image data read in said reading step;

a compression step of compressing the image data to which the invalid data is added in said addition step; and a control step of controlling processing to designate the paper size of the original and valid data in the image data compressed in said compression step, in a case where the image data compressed in said compression step is transmitted to the receiving apparatus.

4. The method according to claim 3, wherein said compression step compresses the image data as the paper size of the original, or compresses the image data as a paper size defined by the recommendation and adds information indicating an image area of the original in a compressed image, in accordance with a capability of the receiving apparatus, in a case where the paper size of the original identified in said identification step is smaller than the paper size defined by the recommendation.

5. A computer-readable storage medium storing a program for executing an image communication method of an image communication apparatus for transmitting a color image according to at least one ITU-T recommendation to a receiving apparatus, said program comprising:

code for an identification step of identifying a paper size of an original;

code for a reading step of reading the original in the paper size of the original and generating image data, in a case where the paper size of the original identified by said code for the identification step is smaller than a paper size defined by the recommendation;

code for an addition step of adding invalid data to the image data read by said code for the reading step;

code for a compression step of compressing the image data to which the invalid data is added by code for the addition step; and code for a control step of controlling processing to designate the paper size of the original and valid data in the image data compressed in said compression step, in a case where the image data compressed by said code for the compression step is transmitted to the receiving apparatus.

6. The computer-readable storage medium according to claim 5, wherein said compression step compresses the image data as the paper size of the original, or compresses the image data as a paper size defined by the recommendation and adds information indicating an image area of the original in a compressed image, in accordance with a capability of the receiving apparatus, in a case where the paper size of the original identified in said identification step is smaller than the paper size defined by the recommendation.

* * * * *